United States Patent
Lundvall

(10) Patent No.: US 7,455,482 B2
(45) Date of Patent: Nov. 25, 2008

(54) METHOD FOR THE MANUFACTURE OF INDEXABLE CUTTING INSERTS AS WELL AS AN INDEXABLE CUTTING INSERT AND A CUTTING TOOL HAVING SUCH A CUTTING INSERT

(75) Inventor: Göran Lundvall, Uppsala (SE)

(73) Assignee: Sandvik Intellectual Property AB, Sandviken (SE)

( * ) Notice: Subject to any disclaimer, the term of this patent is extended or adjusted under 35 U.S.C. 154(b) by 398 days.

(21) Appl. No.: 10/963,578

(22) Filed: Oct. 14, 2004

(65) Prior Publication Data

US 2005/0135884 A1 Jun. 23, 2005

(30) Foreign Application Priority Data

Oct. 14, 2003 (SE) .................................... 0302703

(51) Int. Cl.
*B23B 1/00* (2006.01)
*B26D 1/12* (2006.01)

(52) U.S. Cl. ..................... 407/113; 407/66; 82/1.11; 409/66; 409/131

(58) Field of Classification Search ................ 407/113, 407/67, 66, 46; 82/1.11, 1.4; 409/66, 131
See application file for complete search history.

(56) References Cited

U.S. PATENT DOCUMENTS

| 4,648,760 | A | * | 3/1987 | Karlsson et al. ............. 408/223 |
| 5,810,518 | A | * | 9/1998 | Wiman et al. ............... 407/102 |
| 6,565,297 | B2 | * | 5/2003 | Schmitt ....................... 409/66 |
| 6,921,234 | B2 | * | 7/2005 | Arvidsson et al. ........... 407/103 |
| 7,118,311 | B2 | * | 10/2006 | Astrom ........................ 407/46 |

FOREIGN PATENT DOCUMENTS

EP 0 873 808 A1 10/1998

* cited by examiner

*Primary Examiner*—Willmon Fridie
(74) *Attorney, Agent, or Firm*—Drinker Biddle & Reath LLP

(57) ABSTRACT

An indexable cutting insert has at least first and second cutting edges and first and second edge-location surfaces associated with the first and second cutting edges, respectively. The insert-manufacturing procedure includes forming the first edge-location surface with reference to the first cutting edge, and then forming the second edge-location surface with reference to the second cutting edge. There results an indexable cutting insert having at least two spaced-apart chip-removing cutting edges and a plurality of location surfaces adapted to engage a base body for determining the spatial positions of respective cutting edges, wherein each location surface determines the spatial position of no more than one of the cutting edges.

6 Claims, 6 Drawing Sheets

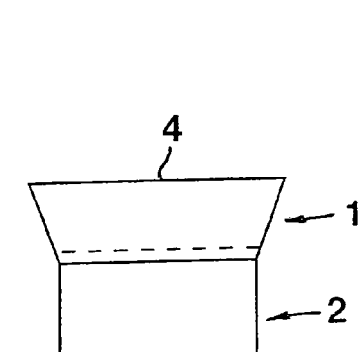
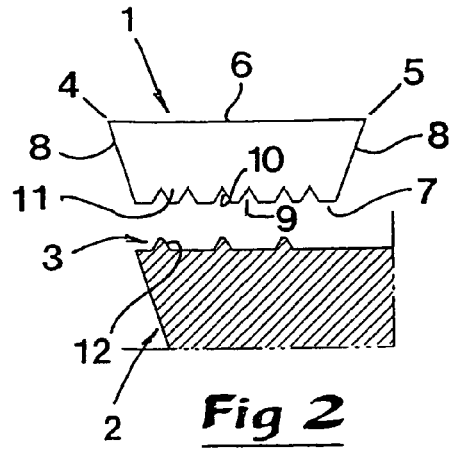
Fig 1
Fig 2
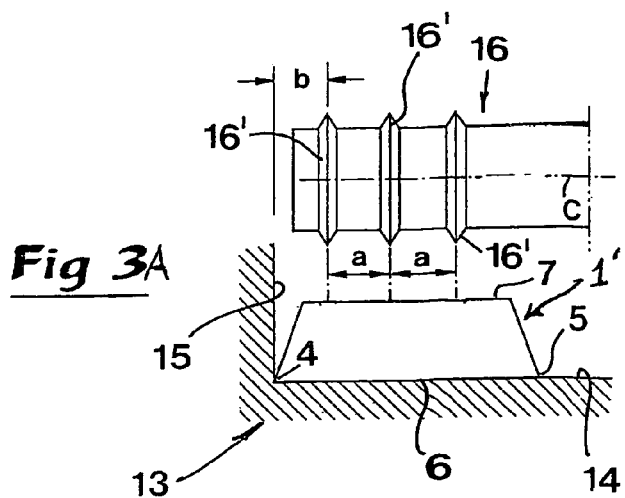
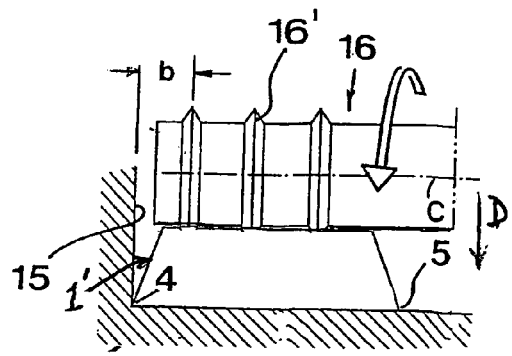
Fig 3A
Fig 3B
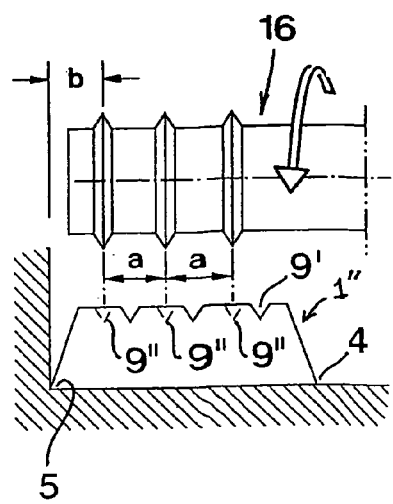
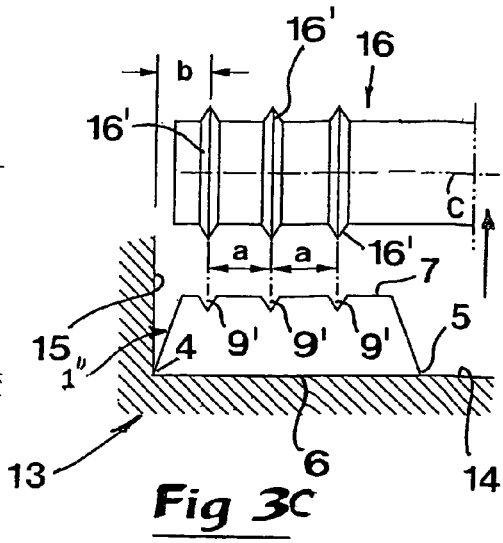
Fig 4
Fig 3C

METHOD FOR THE MANUFACTURE OF INDEXABLE CUTTING INSERTS AS WELL AS AN INDEXABLE CUTTING INSERT AND A CUTTING TOOL HAVING SUCH A CUTTING INSERT

The present application claims priority under 35 U.S.C. § 119 to Patent Application Serial No. 0302703-4 filed in Sweden on Oct. 14, 2003, the content of which is hereby incorporated by reference.

TECHNICAL FIELD OF THE INVENTION

In one aspect, this invention relates to a method for the manufacture of indexable cutting inserts of the type that comprises at least two spaced-apart, chip-removing edges, as well as location surfaces for determining the space-geometrical position of the edges in relation to a co-operating cutting tool.

In another aspect, the invention also relates to an indexable cutting insert as such.

1. Prior Art

Generally, indexable cutting inserts of cutting or chip-removing tools each include at least two edges, which can be worn individually before the cutting insert has to be discarded. Such cutting inserts can be fixed in a so-called insert seat in a basic body, e.g., a milling cutter head, a drill, a boring bar, etc., which together with one or more cutting inserts form a complete, functional tool. In a common type of cutting tool, the insert seat consists of a pocket, which is delimited by a planar bottom surface against which a planar bottom side of the cutting insert is abutted, as well as two upstanding shoulder surfaces oriented at an angle to each other, and which are engaged by respective oblique side surfaces (clearance surfaces) of the cutting insert. Recently, such insert seats have increasingly been replaced by or supplemented with connecting surfaces of the serration (serrated) type in the basic body and in the cutting insert, respectively. Serrated connecting surfaces in the insert consist of one or more ridges formed in the bottom side of the cutting insert, the ridges alternating with grooves. The insert's ridges mechanically engage one or more complementary grooves in the insert seat (and vice versa). Connections of this type give a very torsion resistant and reliable coupling of the cutting insert to the basic body, something that, among other things, makes it possible to eliminate the need for the upstanding supporting shoulder surfaces.

Common to all co-operation between a cutting insert and a basic body irrespective of how the insert seat has been realized is that the cutting insert includes a number of location surfaces, which determine the exact, space-geometrical position of the individual edge that for the moment is active, i.e., indexed to an outwardly exposed position, in which the edge can machine a workpiece. In older, simple cutting inserts for insert seats having planar bottom and side support surfaces, said location surfaces consist of the clearance surfaces of the cutting inserts, i.e., the side surfaces that extend between the top and bottom sides of the cutting insert. However, the location surfaces on the type of cutting inserts having serration connecting surfaces, consist of the flank surfaces of the serration ridges. In analogy with the planar side surfaces of the older simple cutting inserts, said flank surfaces are pressed against abutting surfaces in the insert seat, viz. against corresponding flank surfaces of ridges on the insert seat.

Manufacture of the cutting inserts, which generally are made from cemented carbide or another material that is considerably harder than the material of the basic body (usually steel), generally takes place by compression moulding and sintering or another hardening method. However, inserts made in this way do not have a precision shape, i.e., there are certain shape defects which might result in an imprecise positioning when the insert is positioned on an insert seat. Thus, in order to attain an acceptable positional precision of the cutting edges, the cutting inserts are after-treated by grinding to eliminate the shape defects. However, according to the prior art, such grinding has been effected based on at least one reference surface common to a plurality of cutting edges. If peripheral grinding were avoided (due to the fact that it is expensive and recently of decreasing importance as a consequence of the cutting edges obtaining good precision already upon the compression moulding/sintering), the fact that a reference surface is common to a plurality of edges entails that some form of compromise has to be resorted to in order to minimize the impact of the shape defects. Alternatively, the other location surfaces have to be ground, based on the common reference surface and the cutting edges.

2. Objects and Features of the Invention

The present invention aims at obviating the above-mentioned disadvantages of previously known manufacturing methods and at providing an improved method for the manufacture of indexable cutting inserts. Therefore, a primary object of the invention is to provide a manufacturing method, which guarantees meticulous positional precision of the active cutting edges of the cutting insert without the need of peripheral grinding of the cutting inserts.

An additional object is to provide a manufacturing method by means of which the cutting inserts can be formed with optimum stability and load-carrying capacity, where the cutting insert is most loaded during operation, in particular in an indexed corner between a major cutting edge and a minor cutting edge.

According to the invention at least the primary object is attained by a method of manufacturing an indexable cutting insert which comprises at least first and second cutting edges and first and second edge-location surfaces associated with the first and second cutting edges, respectively. The method comprises the steps of:

A. forming the first edge-location surface with reference to the first cutting edge, and then B. forming the second edge-location surface with reference to the second cutting edge.

In a second aspect, the invention relates to an indexable cutting insert as such. The insert comprises at least two spaced-apart chip-removing edges and a plurality of location surfaces adapted to engage a base body for determining the spatial positions of respective chip-removing edges. Each location surface determines the spatial position of no more than one chip-removing edge.

In a third aspect, the invention relates to a cutting tool which includes a seat on which the cutting insert is mounted.

SUMMARY OF THE INVENTION

The invention is based on the idea of providing the location surfaces of the cutting insert by material-removing machining in at least two operations, viz. a first operation during which a first location surface is formed in an exact, predetermined position in relation to a first cutting edge, and a second operation during which a second location surface is formed in an identical position in relation to a second cutting edge, independently of the actual shape of the cutting insert, i.e., independent of such small, but in practice inevitable shape defects, which arise upon the compression moulding and sintering of the cutting insert. In a particularly preferred embodiment, the location surfaces take the form of flank surfaces in a serrated connecting surface formed on the bottom side of the cutting insert and being of the type that includes long narrow grooves defined between ridges or ridge-like projections. In one embodiment, the position determination of the location surfaces in relation to the respective cutting edge is effected by the individual groove being formed with a depth that successively increases in the direction from a first end of the same towards an opposite, second end.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 1 is a schematic, partial front view showing a cutting insert applied in an insert seat on a basic body of a cutting tool.

FIG. 2 is a longitudinal section through the basic body with the cutting insert separated from the insert seat and seen from the side.

FIG. 3A is a schematic view showing the cutting insert applied in a jig during a first stage of a first machining step.

FIG. 3B is a view similar to FIG. 3A during a second stage of the first machining step FIG. 3C is a view similar to FIG. 3B during a third stage of the first machining step.

FIG. 4 is an analogous view showing the cutting insert during the third state of a second machining step.

DETAILED DESCRIPTION OF PREFERRED EMBODIMENTS OF THE INVENTION

Figure 5:
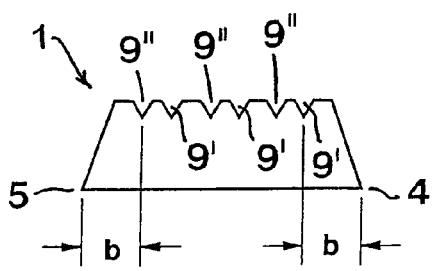
FIG. 5 is a side view showing the cutting insert in a state of completed machining.
Figure 6:
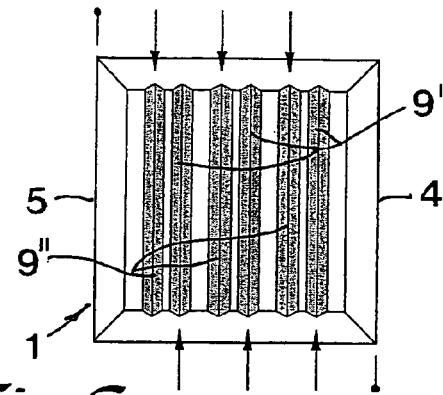
FIG. 6 is a planar view showing the bottom side of the cutting insert in a state of completed machining.

In FIGS. 1-6 and FIGS. 7-9, respectively, two embodiments are shown of indexable cutting inserts manufactured in accordance with a method according to the invention. It should be emphasized that all drawing FIGS. 1-9 are schematic and simplified. Thus, the cutting inserts in question are illustrated just with one serration connecting surface on the bottom side thereof and with two cutting edges. However, in reality, the cutting inserts are formed with a more or less complicated cutting geometry with means for clamping the cutting insert, e.g. a central hole for a tightening screw.

In FIGS. 1 and 2, a cutting insert 1 is shown adjacent to a basic body 2 formed with an insert seat 3, which body together with the cutting insert form a complete cutting tool. The cutting insert 1 has two opposite cutting edges 4, 5, the edge 4 of which is indexed to an intended, active position, while the opposite edge 5 is inactive. The cutting insert is delimited by a top side 6, a bottom side 7, as well as a number of (four) side surfaces or clearance surfaces 8. The bottom side 7 is formed as a serrated connecting surface, which includes a number of grooves 9, which are defined between opposing flank surfaces 10, of mutually adjacent ridges 11. The insert seat 3 in the basic body is in the form of a complementary serrated connecting surface comprising a number of ridges 12 intended to mechanically engage the grooves 9 of the cutting insert.

According to the prior art, all grooves 9 in the serrated connecting surface of the cutting insert have been formed during a single material-removing machining operation, usually grinding or milling. The grooves are spaced apart by distances which are determined by the machining tool in question. Directly pressed inserts which have not been subjected to expensive grinding operations have shape defects resulting from the pressing operation. Such defects certainly are small (some only a few hundredths of a millimeter), but are of importance because they prevent an exact space-geometrical position of the indexed cutting edge in relation to the basic body from being achieved. Thus, the machined serrations are not able to precisely position all of the cutting edges, and it has been necessary to resort to compromises as regards the geometrical position of the serrations relative to the cutting edges.

In this connection, it should also be noted that in the prior art the number of ridges 12 in the insert seat 3 has been equally great as the number of grooves in the cutting insert. In other words, ridges have been in engagement with all the grooves in the cutting insert.

Reference is now made to FIGS. 3A-6, which schematically illustrate the characteristics of the invention. In FIGS. 3A-3C and 4, a jig 13 is shown, in which a base or a support surface 14 as well as an abutment surface 15 are included. With said jig, a machining tool 16 cooperates, which may consist of a rotatable milling or grinding tool. In the example, the tool includes three cams or machining elements 16' which determine the final profile shape of the grooves 9. The machining elements 16' are mutually spaced-apart by a distance "a". Furthermore, the element 16' positioned closest to the abutment 15 is located at a predetermined distance "b" from the abutment. The space-geometrical position of the material-removing tool in relation to the abutment 15 as well as the base 14 is well-defined and static, i.e., reliably repeatable in each machining operation during which the jig and the tool are given a relative motion in relation to each other (usually the jig is stationary and the tool is translationally and linearly movable in addition to being rotatably driven).

In FIGS. 3A-3C, three stages of a first machining step are illustrated during which the edge 4 of a cutting insert (designated 1' in FIGS. 3A and 3B) is kept pressed against the abutment 15, more precisely with the top side of the cutting insert 1' turned downward towards the support surface 14 and with the bottom side exposed upward towards the tool 16. By means of the tool, a first set of grooves 9' is formed in the cutting insert (now designated as 1"), which grooves in the example should be located in a plane that is parallel to the top and bottom sides of the cutting insert. This is done by lowering the tool down in direction D to a level at which the crowns of the machining elements 16' are located on a level below the turned-up bottom side 7 of the cutting insert 1' and spaced from the bottom side as shown in FIG. 3B. Then, the tool is rotated and set in a linear motion (i.e., toward the observer in FIG. 3B) during which the rotation axis C thereof is parallel to the support surface 14, at the same time as the distance "b" of the tool from the abutment is exactly maintained during the entire time it takes for the tool to pass through the cutting insert 1'. In that way, and as shown in FIG. 3C, three grooves 9' are formed, which are parallel to the top side 6 of the cutting insert 1" and are mutually spaced apart by the distances "a" at the same time as the distance "b" between the edge 4 and the groove 9' located closest to the same is exact and predetermined. In this connection, it should be particularly pointed out that the depth of the grooves is not dependent upon the nature of the bottom side 7 because the tool, during the linear motion thereof in relation to the support surface 14, is kept parallel to the support surface, so that all machining elements 16" are located at one and the same predetermined distance from the support surface, i.e., in a common horizontal plane, which is parallel to the support surface. This means that the positions of the grooves in relation to the edge 4 are exactly predetermined in the "x" direction as well as the "y" direction. Thus, even if the cutting insert were to include a small shape defect that manifests itself in that, for instance, the thickness of the cutting insert near the edge 4 is somewhat greater than the corresponding thickness near the edge 5, it would not adversely affect the positioning of the insert on a seat, because the co-ordinates of the respective grooves in an imaginary system of co-ordinates having an x-axis defined by the abutment 15 and a y-axis defined by the support surface 14, will still be exactly predetermined.

Reference is now made to FIG. 4, wherein the insert 1" resulting from FIGS. 3A-3C is about to be subjected to a second, final machining operation. Here the cutting insert 1" has been turned 180° so that the edge 5 has been pressed against the abutment 15, while the edge 4 is distanced from the same. With the cutting insert 1" fixed in this state, the machining operation described above in connection with FIG. 3B is repeated, whereupon an additional set of grooves 9" is formed between the previously shaped grooves 9'. Thanks to the static and well-defined relative position between the machining tool 16 and the jig 13, as well as the fact that the tool during the linear movement is kept on exactly the same level above the support surface 14 as in the last case, these additional grooves 9" (shown only in broken lines in FIG. 4) will be located in exactly the same positions in relation to the coordinated edge 5 as the previously shaped grooves 9' are located in relation to the coordinated edge 4 thereof. The final insert, designated 1, is shown in FIG. 5.

Generally, in the usual way the recessed grooves 9', 9" have a V-shaped cross-section, the individual groove being delimited by two flank surfaces 10 oriented at an acute angle (e.g., 60°) to each other. As is outlined in FIG. 2, the co-operating ridges 12 are likewise cross-section-wise V-shaped, although truncated in order not to touch the bottom in the grooves. Thus, when the ridges engage the grooves, there is solely surface contact between the pairs of co-operating flank z surfaces. As is clearly seen in FIG. 6, the grooves and the flank surfaces, respectively, are of a uniform width along the entire length thereof (i.e., the straight edge lines that form transitions between the flank surfaces and the otherwise planar bottom side of the cutting insert are mutually parallel).

In FIG. 2, it is seen how the number of ridges 12 in the serration surface of the insert seat 3 is only half as large as the number of grooves 9 in the serration surface of the cutting insert shown in FIG. 5. Furthermore, the mutual distances between the ridges 12 are identical with the distances "a" between the grooves in the respective sets of grooves. Therefore, when the cutting insert is applied and fixed in the insert seat, the ridges 12 will engage only every second groove in the cutting insert. More precisely, the three shown ridges 12 engage only the grooves 9', if the edge 4 is indexed to an active position, while the grooves 9" coordinated with the inactive edge 5 are inactive to the extent that they do not house any ridges 12. When the edge 4 has been worn out and the second edge 5 has been indexed to an active position, the same ridges 12 engage only the second set of grooves 9", i.e., the grooves that are located in exactly the same positions in relation to the appurtenant edge 5 as the grooves 9' in relation to the edge 4.

Thus, the orientation of the initially-shaped grooves 9' will be precisely adapted positionally to the cutting edge 4, whereas the orientation of the subsequently shaped grooves 9" will be precisely adapted positionally to the cutting edge 5. Accordingly, even though the insert may be characterized by certain shape defects, and even though no peripheral grinding has been performed, it will be possible to precisely position each cutting edge.

Figure 7:
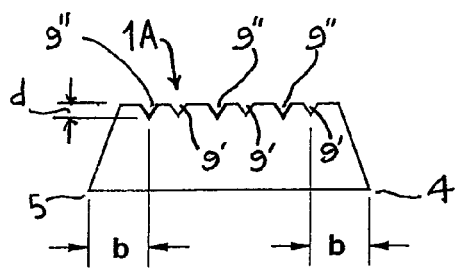
FIG. 7 is a schematic side view showing an alternative embodiment of a cutting insert according to the invention.
Figure 8:
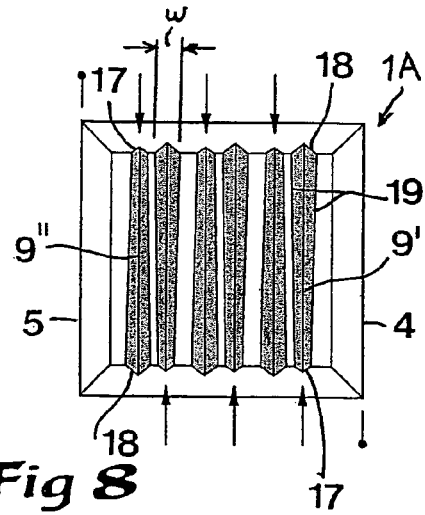
FIG. 8 is a planar view showing the bottom side of the cutting insert according to FIG. 7.
Figure 9:
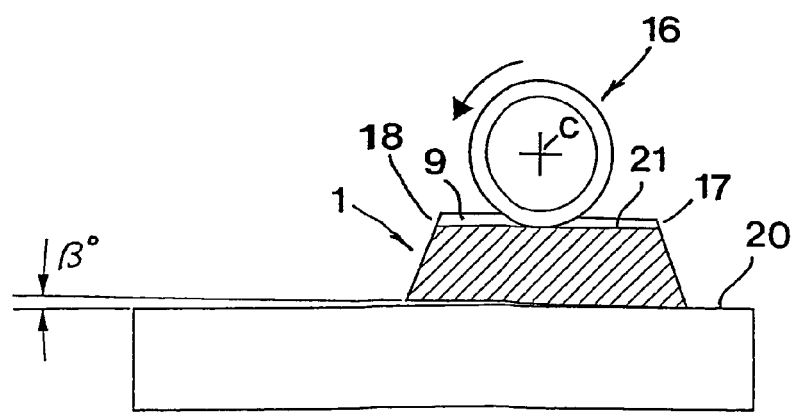
FIG. 9 is a schematic side view illustrating the machining of a cutting insert according to FIGS. 7 and 8.
Figure 10:
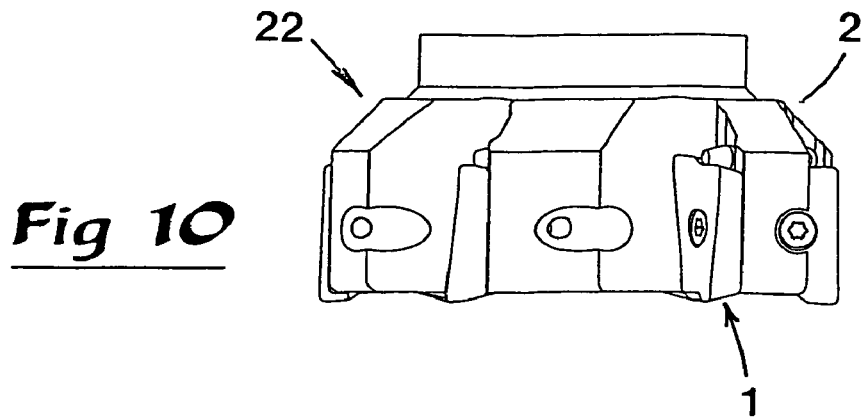
FIG. 10 is a side view of a basic body in the form of a milling cutter head having cutting inserts according to the invention.
Figure 11:
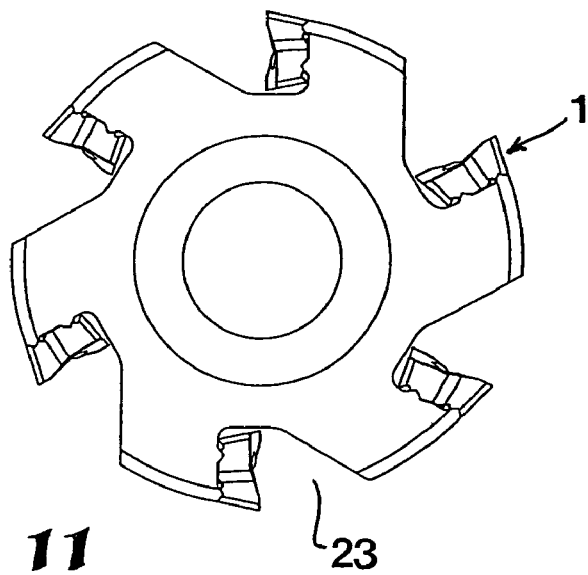
FIG. 11 is a front view of the milling cutter head according to FIG. 10.
Figure 12:
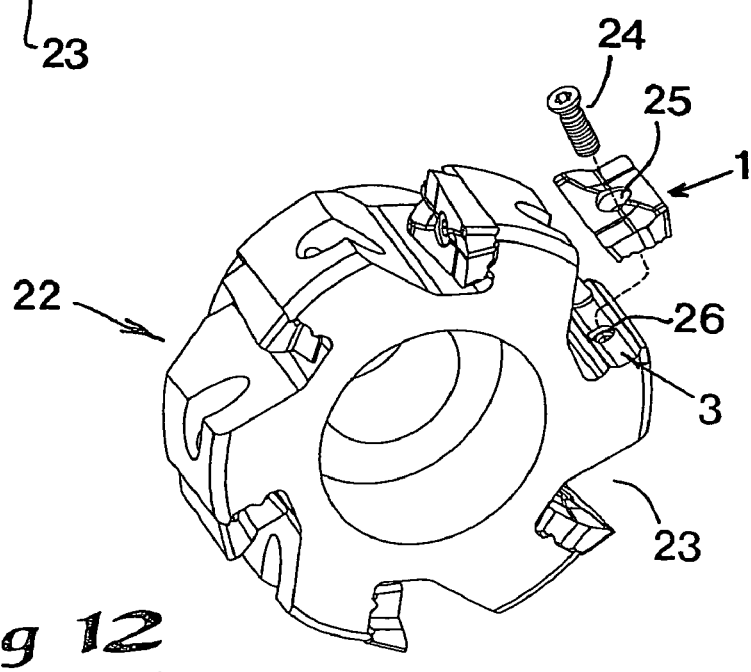
FIG. 12 is a perspective front view of the milling cutter head of FIG. 10.

Reference is now made to FIGS. 7-9, which schematically illustrate how the individual grooves according to an alternative embodiment of an insert 1A according to the invention may be formed with a depth d that successively increases in the direction from one end of the groove to the other. Thus, in FIGS. 7-8, it is seen how the grooves 9' coordinated with the edge 4 of the insert 1A are formed with a depth that is smallest at a first groove end 17 and successively increases (suitably uniformly) in the direction of the opposite groove end 18. The intermediate grooves 9", which are coordinated with the second edge 5, also have a depth that successively increases in the direction from a first groove end 17 to the opposite second groove end 18. Said last-mentioned grooves 9" have, however, the shallow, first groove ends 17 thereof disposed in the same peripheral surface 13 of the insert as the deep, second ends 18 of the grooves 9' (and vice versa). Because the grooves, at least partially, have a V-shaped cross section, the individual flank surfaces that define each groove have an increasing width w in a direction from the first end 17 to the second end 18, each individual groove having a wedge-like tapering contour shape determined by the edge lines 19 of the groove adjacent to the generally planar bottom side of the cutting insert.

In FIG. 9 it is shown how the successively increasing depth of the grooves 9 may be provided by the cutting insert being located at a certain angle B in relation to a reference plane 20 as a machining tool 16 moves parallel to the plane 20 during the translational motion thereof through the cutting insert. Naturally, it is also possible to move the tool in a plane that is inclined B° to the reference plane 20 at the same time as the top and bottom sides of the cutting insert are parallel to said plane. In this connection, it should be particularly pointed out that the geometrical centre axis C for the tool in this case is assumed to be parallel to the top or bottom sides of the cutting insert, even if the axis in question during the relative motion of the tool is moved in a plane that is inclined in relation to the cutting insert. This means that the bottoms 21 in the grooves in one and the same set of grooves 9' and 9", respectively, are located in a common, imaginary plane, which is inclined at the angle β in relation to the plane in which the edges 4, 5 are jointly located, but simultaneously parallel to the two other edges of the cutting insert.

Reference is now made to FIGS. 10-15, which show the invention applied to a cutting tool in the form of a milling cutter 22, which includes a basic body in the form of a milling cutter head 2, which is equipped with a number of indexable cutting inserts 1. More precisely, the cutting inserts are mounted in insert seats 3 in peripheral, tangentially spaced chip pockets 23. For fixation of the cutting inserts in the insert seats, in this case tightening screws 24 are used, which are inserted into through holes 25 in the cutting inserts and fastened in threaded holes 26 in the insert seats.

Figure 13:
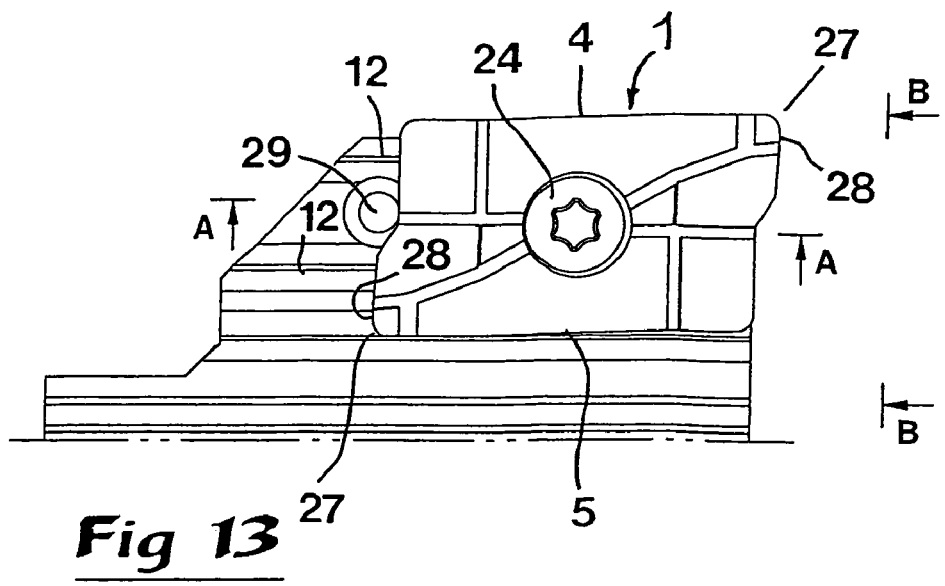
FIG. 13 is an enlarged planar view of a cutting insert included in the milling cutter head applied in an insert seat in the milling cutter head.
Figure 14:
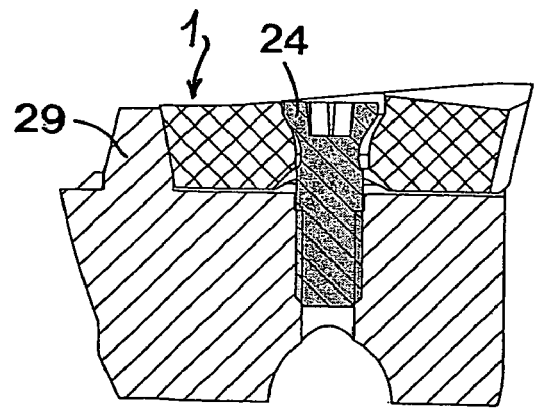
FIG. 14 is a section taken along line A-A in FIG. 13.
Figure 15:
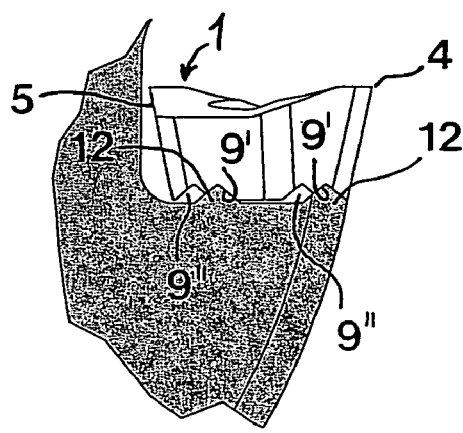
FIG. 15 is a side view taken in the direction B-B in FIG. 13.
Figure 16:
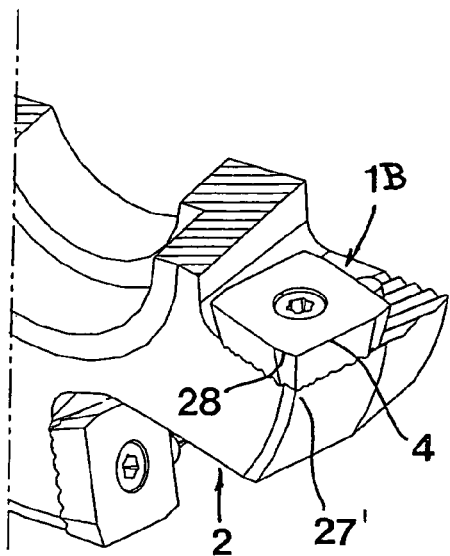
FIG. 16 is a partial perspective view showing an alternative embodiment of a cutting insert according to the invention mounted in a milling cutter.
Figure 17:
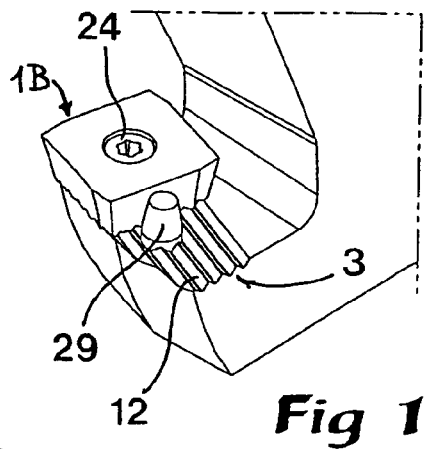
FIG. 17 is a perspective view showing the cutting insert of FIG. 16 from another angle.
Figure 18:
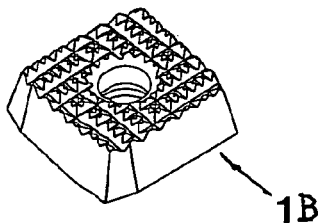
FIG. 18 is a perspective view showing the bottom side of the cutting insert according to FIGS. 16 and 17.
Figure 19:
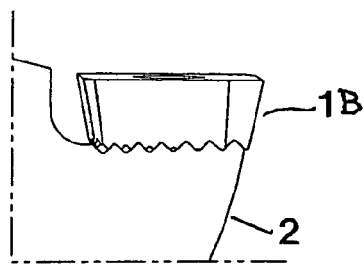
FIG. 19 is a side view of the cutting insert together with the appurtenant insert seat in the milling cutter.
Figure 20:
FIG. 20 is a side view of solely the cutting insert of FIG. 16.
Figure 21:
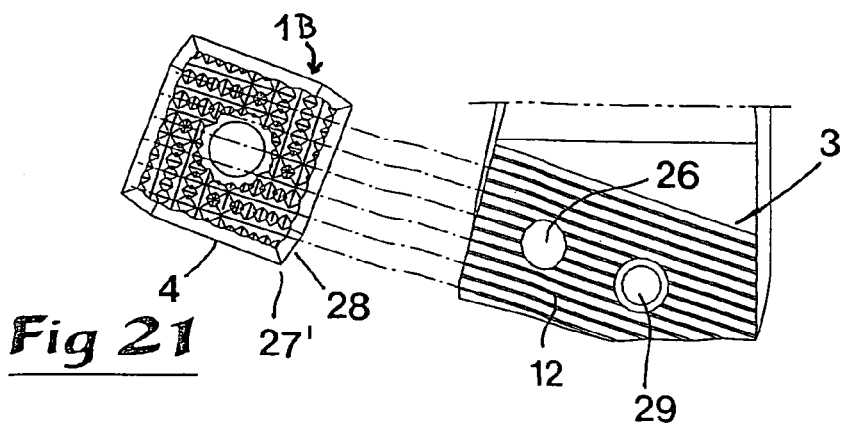
FIG. 21 is a planar view of the insert seat together with the bottom side of the cutting insert.

As seen in FIG. 13, the cutting insert is indexable in two positions by being formed with two major cutting edges 4, 5, which via corners 27 transform into minor cutting edges or wiper edges 28. The major cutting edges 4 are mainly loaded by radial forces, which are considerably larger than the axial forces that act against the wiper edges 28. The axial position of the cutting insert is determined by an axial stop 29 in the form of a protruding spigot. The radial position of the cutting insert is determined by a serration connection comprising two ridges 12 in the insert seat 3, as well as grooves 9 in the cutting insert. Said ridges 12 may alternately co-operate with two pairs of grooves 9' and 9", respectively, in the cutting insert. In the example according to FIG. 15, the edge 4 is indexed and active, the ridges 12 engaging the grooves 9', while the grooves 9" are empty and inactive. When the edge 5 is indexed to active position, the opposite relation is at hand. In both cases, the exact, space-geometrical position of the active cutting edge in relation to the insert seat 3, and thereby also in relation to the cutter head 2, is determined by the coordinated set of grooves, the position of which in relation to the edge is meticulously established in the previously described way.

In this connection, it should be pointed out that for the implementation of the invention it would be sufficient to define the position of the active cutting edge by means of only one groove together with a ridge engaging the same. Thus, in the example shown in FIG. 15, it is feasible to let the rear or inner part of the cutting insert rest against a suitable support surface in the insert seat without engagement of any inner or rear ridge in a corresponding groove, i.e., the left-hand ridge 12 and corresponding insert grooves in FIG. 15 would be eliminated.

Reference is now made to FIGS. 16-27, which illustrate an additional example of an indexable cutting insert 1B, which has been made by applying the principles of the invention. Also in this case, the cutting tool consists of a milling cutter, but here, the cutting insert has four edges and a quadrangular, symmetrical basic shape, i.e., the insert has four cutting corners, which can be selectively placed in an active cutting position. The nature of a serrated connecting surface formed on the bottom side of the cutting insert is most clearly seen in FIGS. 22-27.

Figure 22:
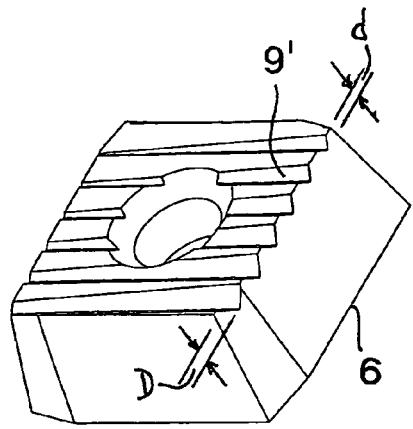
FIG. 22 is a perspective view of an insert following a first machining operation for providing a serration connecting surface on the bottom side of the cutting insert.
Figure 23:
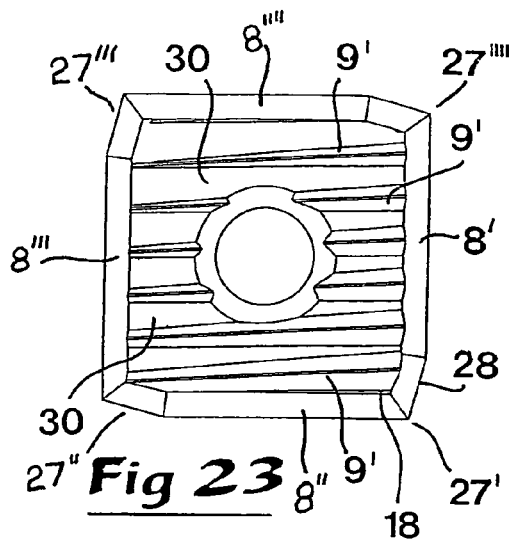
FIG. 23 is a planar view of the cutting insert according to FIG. 22.

The four cutting corners (see FIG. 25) of the cutting insert are designated 27', 27", 27'" and 27"". Adjacent to each such corner, e.g. the corner 27', there is a major cutting edge 4, as well as a minor cutting edge or wiper edge 28. The design of a generally waffle-patterned serrated connecting surface on the bottom side of the cutting insert takes place in four operations, a first one of which is shown in FIGS. 22 and 23.

During this initial operation, a first set of grooves 9' is formed, for instance, by means of a rotatable machining tool, which grooves become position-determining for the major cutting edge 4 of the corner 27' (i.e., the grooves 9' are associated with the corner 27'), and which carry the radial and tangential forces that act on the cutting insert. In the example, the number of grooves is six, each groove generally having a wedge-shaped tapering contour shape by being formed with a successively increasing depth d as described earlier in connection with the making of insert 1A. More precisely, the grooves deepen from the left to the right in FIGS. 22 and 23 so that each groove has its maximum depth (and also its maximum width) disposed at the clearance surface 8'). However, the maximum depth D of the groove 9a' of the first set 9' is greater than the maximum depth d of the groove 9'b of the first set 9'. In other words, the maximum depth D of the groove 9'a located closest to the associated corner 27' is greater than the maximum depths of the remaining grooves of the first set 9'. Stated another way, the groove 9'b is shallower than the groove 9'a. That result can be achieved by making the rotation axis of the machining tool non-parallel to the planar bottom side of the cutting insert, when the tool is moved through the cutting insert in the direction from the left to the right. Instead, the tool is set at a certain angle of inclination in relation to the cutting insert. An advantageous consequence of this is that the flank surfaces of the groove 9'a located closest to the associated corner 27' have a large flank surface width. In this connection, it should be noted that the deepest groove 9'a of the first set 9' has its deepest end disposed in the clearance surface 8' in which the wiper (minor) cutting edge 28 of the associated corner 27' is formed. Moreover, the grooves 9' have their respective longitudinal axes oriented parallel to, or at a slight inclination to (e.g., 1-10°), the major cutting edge 4 of the associated corner 27'.

In the areas between the wedge-shaped grooves 9', unmachined surface fields 30 are left, which likewise are wedge-shaped, although pointing towards opposite directions.

Figure 24:
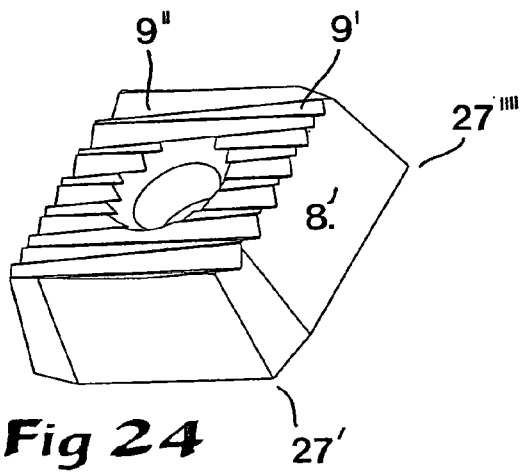
FIG. 24 is a perspective view showing the cutting insert according to FIGS. 22 and 23 after a second machining operation.
Figure 25:
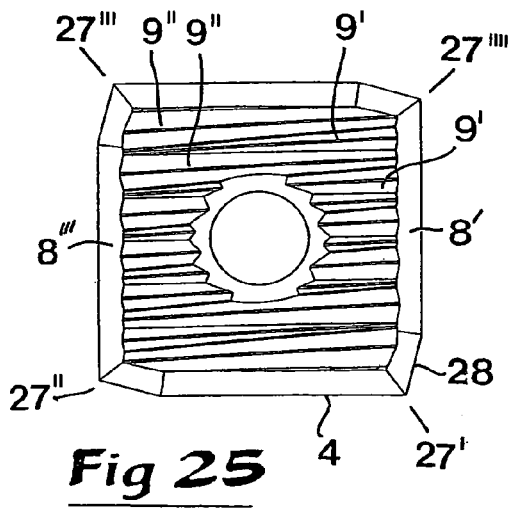
FIG. 25 is a planar view of the cutting insert according to FIG. 24.

Then, three additional sets of grooves 9", 9'" and 9"" are formed in an analogous way to the first set 9', i.e., such that in each set there is a deepest groove arranged closest to a respective corner. Thus, in a second machining operation, which is illustrated in FIGS. 24 and 25, a second set of grooves 9" is formed, viz. in the surface fields 30 between the grooves 9'. As may be clearly seen to the left in FIG. 25, the groove 9'", which is situated closest to the corner 27'" that is diametrically opposite the corner 27', has a maximum depth, while the depths of other grooves 9" in the same set of grooves successively decrease in the direction of the corner 27".

Figure 26:
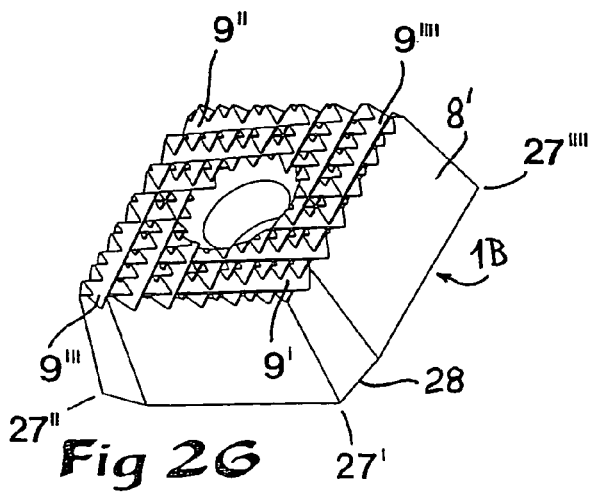
FIG. 26 is a perspective view of the cutting insert following two additional machining operations.
Figure 27:
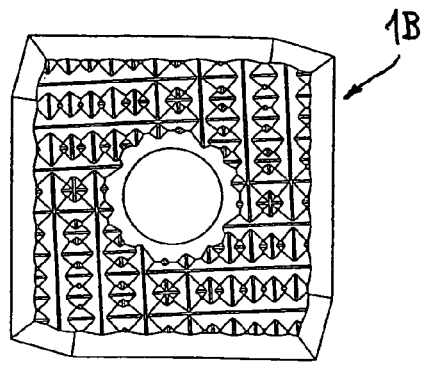
FIG. 27 is a planar view of the cutting insert according to FIG. 26.

In FIGS. 26 and 27, a cutting insert in a state of completed machining is shown, which insert has been subjected to the third and fourth machining operations during which two additional sets of grooves 9'" and 9"", respectively, have been formed parallel to one another and at right angles to the grooves 9' and 9", respectively. Of the grooves 9'", the deepest groove is located adjacent to the corner 27", while the deepest one of the grooves 9"" is located adjacent to the corner 27"".

The four sets of grooves 9', 9''', 9'''' and 9'''' define together a great number of substantially pyramidal-shaped projections of varying height, which together form a waffle-like pattern on the bottom side of the cutting insert.

In FIGS. 16-21, it is seen that the insert seat 3, in which the cutting insert 1 is mounted, includes six male-like ridges 12 for cooperation with the four different sets of grooves of the cutting insert. Thus, said ridges 12 engage all grooves in one and the same set of grooves, but not the grooves of any other set of grooves, depending upon how the insert has been indexed. In other words, if the insert is indexed such that the corner 27' becomes the active corner, the ridges 12 will engage only the grooves 9'.

A substantial advantage of the cutting insert and the tool according to FIGS. 16 to 27 is that the cutting insert can be given an optimum stability and load-carrying capacity only where the cutting insert is most loaded during operation, viz, in the area of the individual, indexed corner to which the active edges of the cutting insert connect.

The invention is not limited only to the embodiments described above and shown in the drawings. Thus, the invention is also applicable to such simple cutting inserts that do not have serrated connecting surfaces, but merely upstanding shoulder surfaces in order to position determine the active cutting edge. In such cases, one of a plurality of cutting edges is coordinated with an opposite side surface.

What is claimed is:

1. A method of manufacturing an indexable cutting insert comprising at least first and second cutting edges and first and second edge-location surfaces associated with the first and second cutting edges, respectively, the method comprising the steps of:
    fixing the insert in a jig which includes an abutment oriented in a predetermined position relative to a machining tool, and then
    forming the first edge-location surface with reference to the first cutting edge, the
    forming the first edge-location surface including pressing the first cutting edge against the abutment while the machining tool and the jig are subjected to relative movement to form the first edge-location surface, and then
    forming the second edge-location surface with reference to the second cutting edge, the forming the second edge-location surface including pressing the second cutting edge against the abutment while the machining tool and the jig are subjected to a relative movement to form the second edge-location surface.

2. A method of manufacturing an indexable cutting insert comprising at least first and second cutting edges and first and second edge-location surfaces associated with the first and second cutting edges, respectively, the method comprising the steps of:
    forming the first edge-location surface with reference to the first cutting edge, and then
    forming the second edge-location surface with reference to the second cutting edge,
    wherein the first and second edge-location surfaces are defined by respective groove structures machined in a bottom surface of the insert, and wherein each groove structure includes first and second ends, each groove structure increasing in depth from the first end to the second end.

3. The method according to claim 2 wherein each groove structure has a generally V-shaped cross section and has an increasing width from the first end to the second end.

4. The method according to claim 3 wherein each groove structure comprises a plurality of parallel grooves, the grooves of the first groove structure arranged in alternating relationship to the grooves of the second groove structure.

5. An indexable cutting insert comprising:
    at least two spaced-apart chip-removing cutting edges;
    a plurality of location surfaces adapted to engage a base body for determining the spatial positions of respective cutting edges, wherein each location surface determines the spatial position of no more than one of the cutting edges;
    top and bottom surfaces intersected by clearance surfaces, the cutting edges being disposed on the top surface, the bottom surface of the insert being serrated and including a first set of spaced-apart grooves, and a second set of spaced-apart grooves, each groove of the first and second sets including flank surfaces which constitute the location surfaces, each groove includes opposite ends and has a generally V-shaped cross section, and each groove has a width increasing from one end to the other end, the top surface includes, at each corner, a main cutting edge and a secondary cutting edge converging toward one another, each location groove having a depth increasing from one end of the groove to the other end, wherein the maximum groove width and the maximum groove depth are located at the same end of each groove, each groove having its deepest end disposed in a clearance surface in which is located the minor cutting edge of the corner associated with such location groove, and each location groove having a longitudinal axis thereof oriented parallel to the major cutting edge of the corner associated with such location groove; and
    four corners, four clearance surfaces, and first, second, third and fourth sets of location grooves, the location grooves of each set being parallel to one another and extending from one clearance surface to an oppositely located clearance surface, the first and second sets being parallel to one another and perpendicular to the third and fourth sets, the grooves of each set having a maximum width disposed in a common clearance surface, one groove of each set having its maximum width located adjacent an associated corner of the insert, which maximum depth is greater than the maximum widths of the remaining grooves of the same set.

6. The cutting insert according to claim 5 wherein the location grooves of each set have their respective bottoms lying in a common plane inclined relative to a plane defined by the bottom surface of the insert.

* * * * *